United States Patent [19]

LeJuerrne

[11] Patent Number: 4,754,998
[45] Date of Patent: Jul. 5, 1988

[54] CATAMARAN-CAMPER-TRAILER

[76] Inventor: Richard J. LeJuerrne, P.O. Box 10, Wellington, Kans. 67152

[21] Appl. No.: 9,692

[22] Filed: Feb. 2, 1987

[51] Int. Cl.4 .............................................. B60P 3/34
[52] U.S. Cl. ..................................... 296/173; 296/27; 280/414.1
[58] Field of Search .................. 296/173, 157, 27, 165, 296/168, 169, 163, 136; 135/88; 280/414.1

[56] References Cited

U.S. PATENT DOCUMENTS

| | | | |
|---|---|---|---|
| 3,065,019 | 11/1962 | May | 296/17 |
| 3,420,567 | 1/1969 | Christensen | 296/27 |
| 3,445,134 | 5/1969 | Pair et al. | 296/173 |
| 3,608,953 | 9/1971 | Bernard | 296/27 |
| 3,884,520 | 5/1975 | Peterson | 296/27 |
| 3,917,337 | 11/1975 | Couix | 296/169 |
| 4,243,242 | 1/1981 | Waits | 280/414.1 |

Primary Examiner—Robert R. Song
Attorney, Agent, or Firm—John Wade Carpenter

[57] ABSTRACT

A catamaran/camper/trailer combination having the catamaran straddling the camper vehicle is supported by the trailer. The camper disassembles from a compact, traveling position into an erect position that includes a seating/sleeping area, a stove-sink assembly, a pair of moisture-proof fabrics, and a collapsible door.

31 Claims, 7 Drawing Sheets

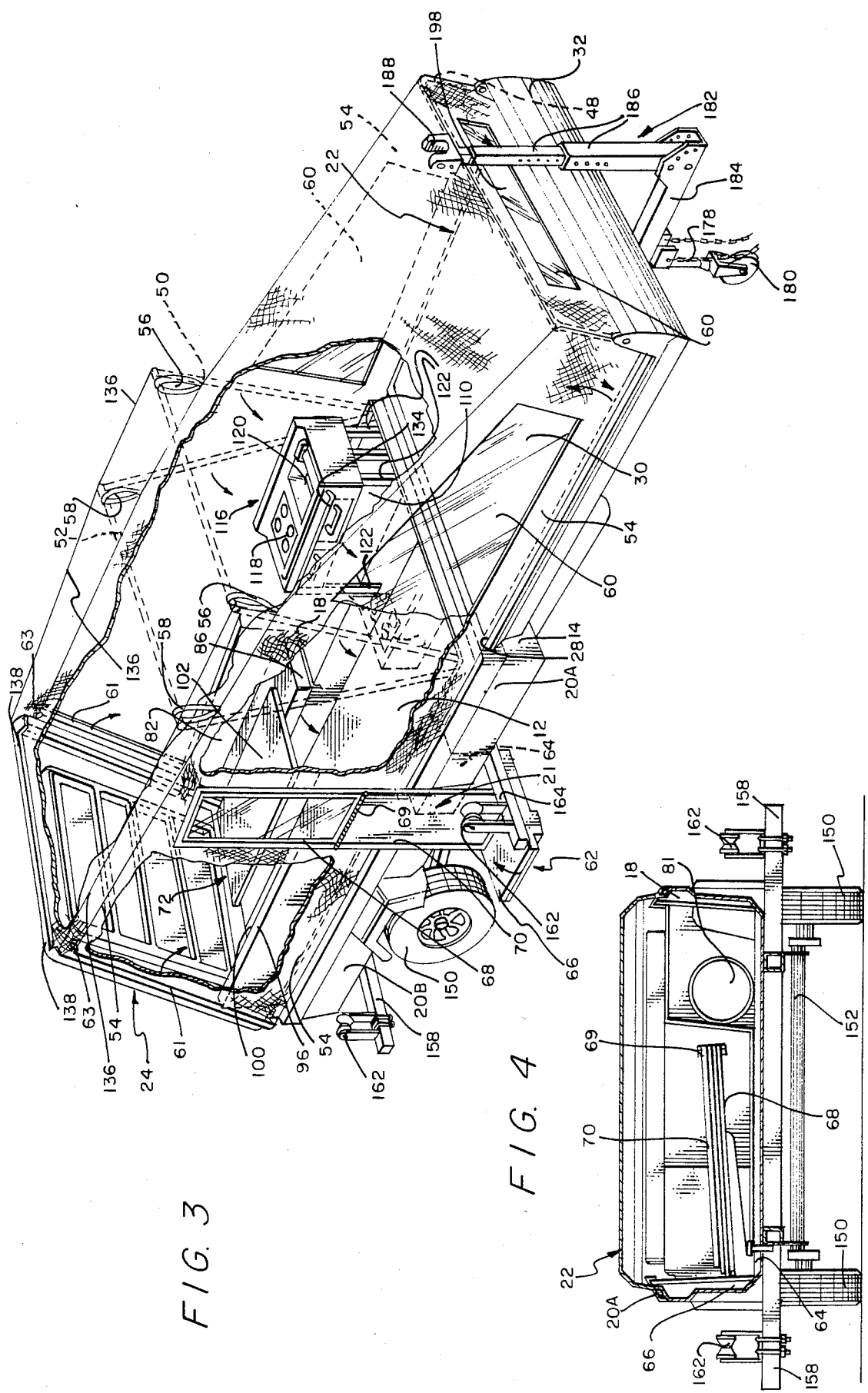

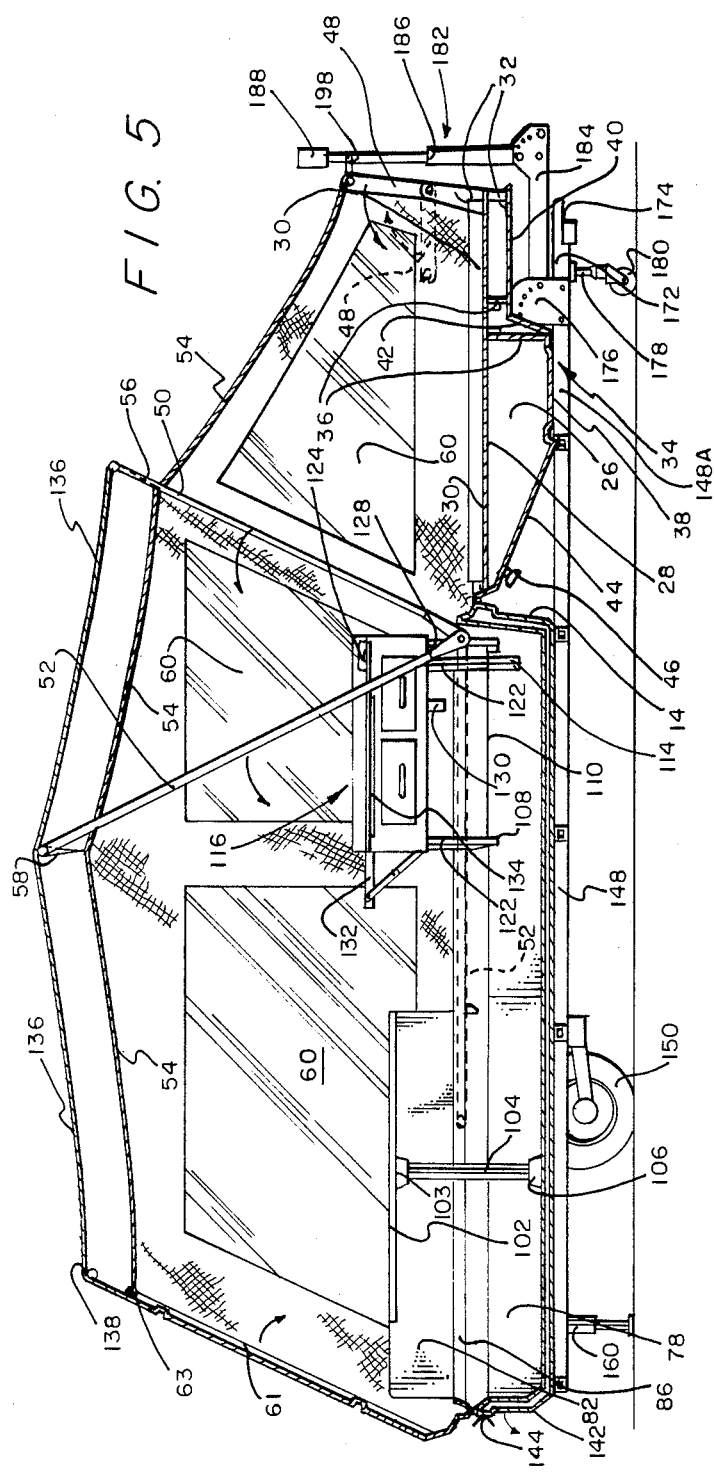
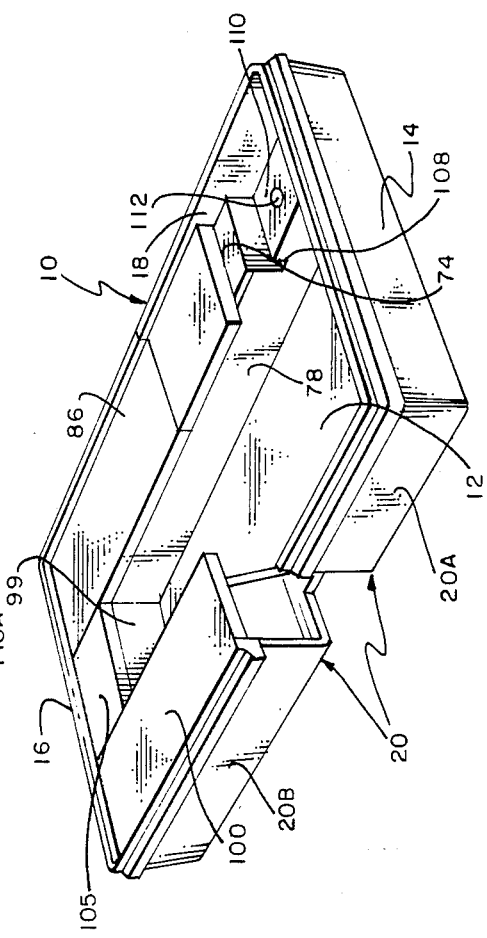
FIG. 5
FIG. 6

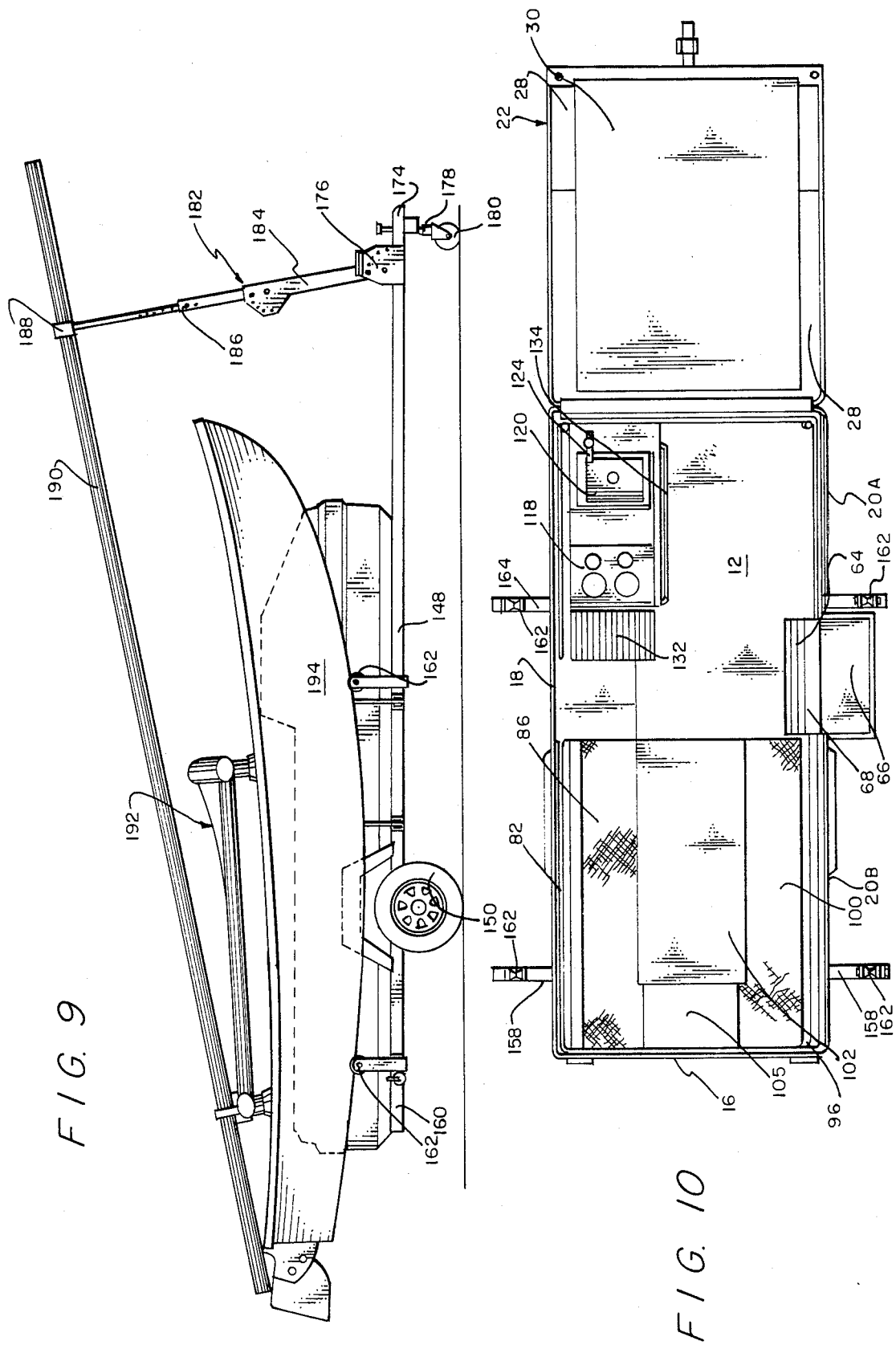

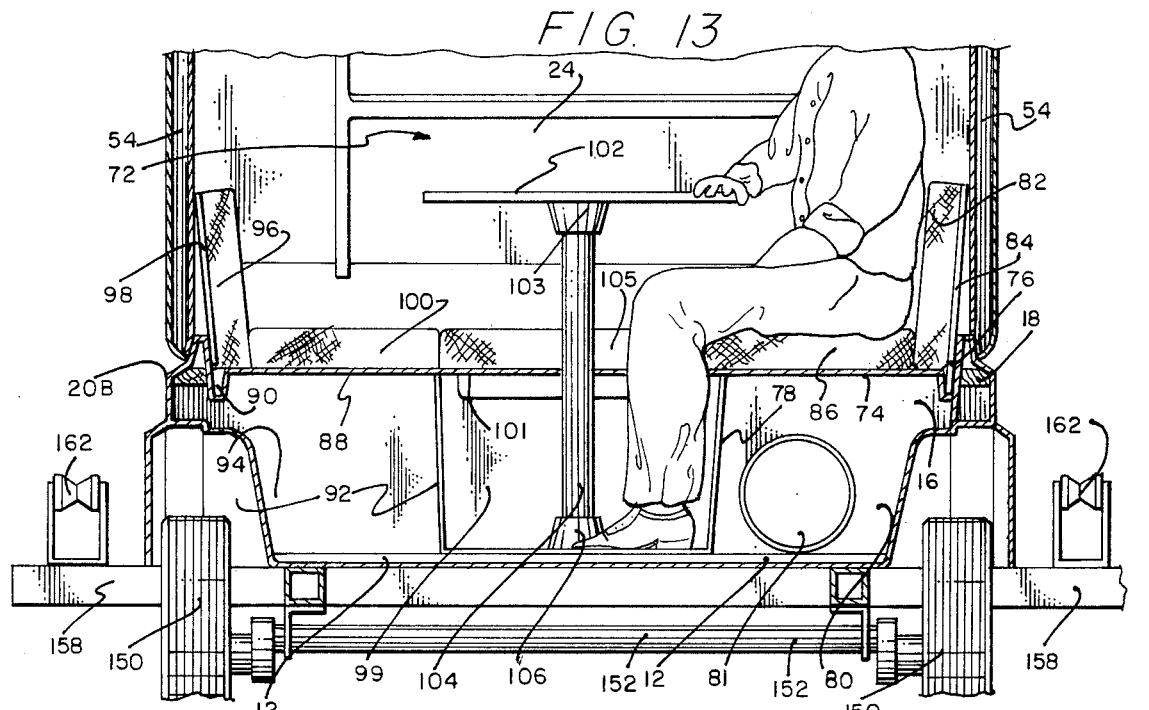
FIG. 13
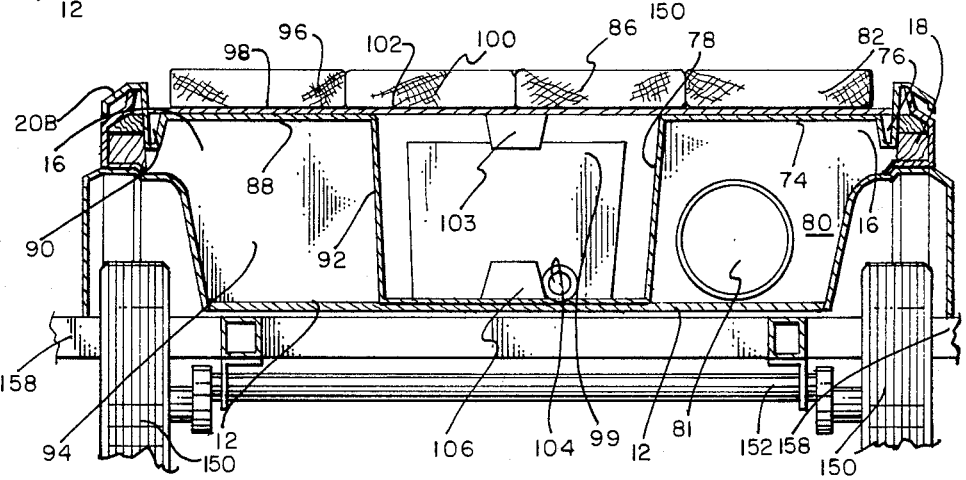
FIG. 14
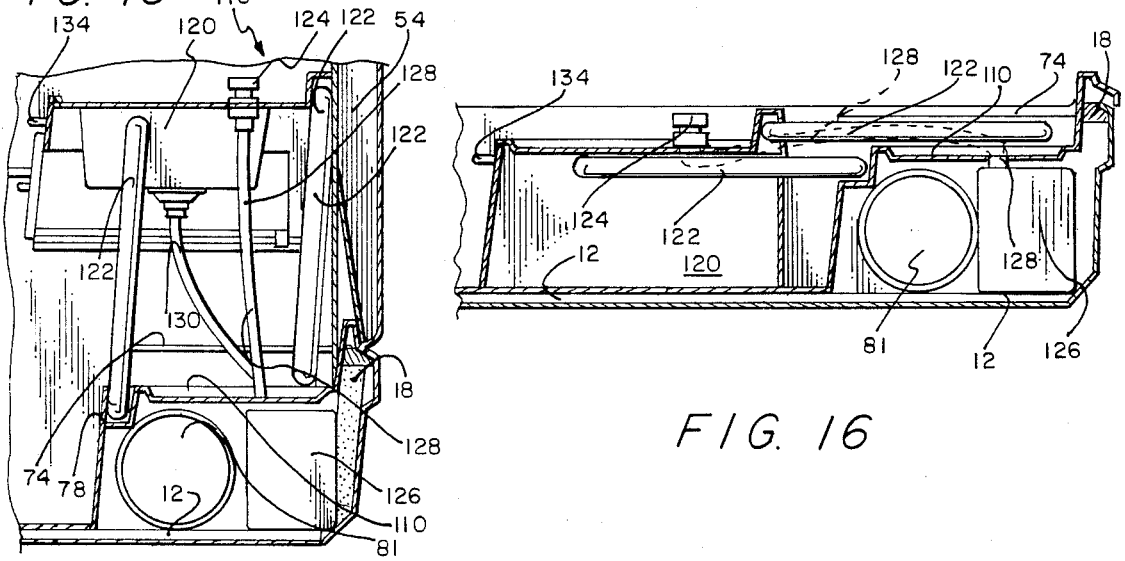
FIG. 15
FIG. 16

CATAMARAN-CAMPER-TRAILER

BACKGROUND OF THE INVENTION

1. Field of the Invention.

This invention is related to a camper. More specifically, this invention provides a collapsible camper that is mounted on a trailer with a plurality of rollers to support a catamaran that straddles the camper when the camper is in a collapsed position.

2. Description of the Prior Art.

Italian Pat. No. 655,951 discloses a boat wherein a plurality of post may be erected to support sails or the like. French Pat. No. 1,443,707 teaches trailers wherein a boat may be carried on top of the trailer. Similarly, French Pat. No. 2,378,428 also teaches a trailer wherein a boat may be supported by the top of the trailer. In both of the French Patents, the trailers may be disassembled into a camper form. U.S. Pat. Nos. 3,486,787 to Howarth, 3,909,057 to Guthry, and 4,188,056 to Watson all disclose a combination camper and boat vehicle wherein the boat is carried underneath the camper. The camper may be disassembled into an occupancy form. U.S. Pat. No. 3,866,772 by Gardner teaches a two deck sport trailer. None of the foregoing prior art teaches or suggests the particular catamaran/camper/trailer of this invention.

SUMMARY OF THE INVENTION

This invention accomplishes its desired objects by providing a catamaran/camper/trailer. More specifically, this invention accomplishes its desired objects by providing a camper that may be mounted on a trailer that includes a plurality of upstanding boat rollers for supporting a catamaran which straddles the camper. The camper of this invention comprises a camper base means having a camper floor, an upright front wall attached to the camper floor, an upright back wall secured to the camper floor, an upright first side wall connected to the camper floor, and an upright second side wall attached to the camper floor. A collapsible door interrupts the upright second side wall into a first side wall section and a second side wall section. The collapsible door is pivotally connected to the camper floor. A front top is pivotally secured to the top of the upright front wall, and a back top is pivotally secured to the top of the upright back wall such that when the front top and the back top are pivoted downwardly to rest on the upright first side wall and on the upright second side wall, the front top and the back top meet to cover the entire camper floor. A front rod is pivotally connected to the front top and a pair of generally U-shaped rods are pivotally secured to the upright first side wall and the upright second side wall. A moisture-proof fabric connects to the front rod, to the pair of generally U-shaped rods, and to the back top in order to enclose the camper. The trailer of this invention includes a step for supporting the front top, and a mast support for engaging the front rod. The camper also includes a seating-sleeping assembly and a stove-sink assembly. Both assemblies are capable of being disassembled or pivoted to the floor of the camper such that when the door is collapsed and when the front rod and the pair of generally U-shaped rods are pivoted downwardly to a generally horizontal position with respect to the floor of the camper, the front top and the back top may be pivoted to entirely enclose the seating-sleeping assembly, the stove-sink assembly, the collapsible door, as well as the moisture-proof fabric which collapses into the camper base area.

It is therefore an object of this invention to provide a camper.

It is another object of this invention to provide a camper which is mounted on a trailer.

It is yet still another object of this invention to provide a catamaran/camper/trailer combination.

These together with the various ancillary objects and features which will become apparent as the following description proceeds, are attained by this invention, preferred embodiments being shown in the accompanying drawings, by way of example only, wherein:

BRIEF DESCRIPTION OF THE DRAWINGS

FIG. 3 is a perspective view of the camper in a disassembled position;

FIG. 4 is a vertical sectional view through the body of the camper disclosing the collapsible door in a collapsed position;

FIG. 5 is a front elevational view of the camper in a disassembled position disclosing the pair of generally U-shaped rods holding a pair of moisture-proof fabrics and the seating-sleeping assembly and the stove-sink assembly;

FIG. 6 is a perspective view of the camper base;

FIG. 9 is a side elevational view of the catamaran/camper/trailer of FIG. 8;

FIG. 10 is a top plan view of the front top pivoted away from the camper and the back top removed from the camper to expose the seating-sleeping assembly, the stove-sink assembly, and the door which is in an upright position such as depicted in FIG. 3;

FIG. 13 is an end elevational view disclosing the seating-sleeping assembly area of the camper;

FIG. 14 is an end elevational view of the seating-sleeping assembly when the assembly has been positioned for sleeping;

FIG. 15 is a partial end elevational view of the stove-sink assembly in an upright position; and FIG. 16 is a side elevational view of the stove-sink assembly when the assembly has been pivoted down to rest on the camper floor.

DETAILED DESCRIPTION OF THE INVENTION

Figure 1:
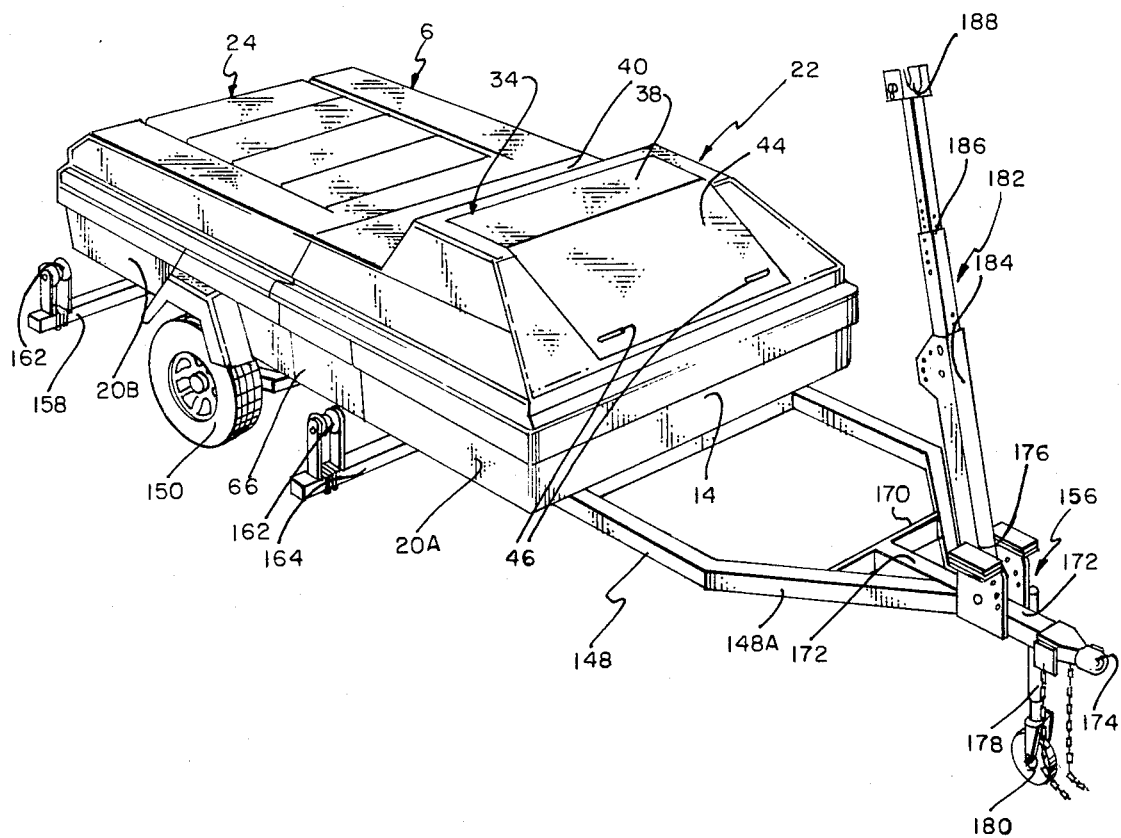
FIG. 1 is a perspective view of the camper of this invention mounted on the trailer of this invention wherein the camper is in a collapsed position so that it may be readily towed with the trailer.

Referring in detail now to the drawings wherein similar parts of the invention are identified by like reference numerals, there is seen a camper, generally illustrated as 6, that is mounted on a trailer, generally illustrated as 8. The camper 6 comprises a camper base, generally illustrated as 10. Camper base 10 includes a floor 12, an upright front wall 14 secured to the floor 12, and an upright back wall 16 also secured to the floor 12. An upright first side wall 18 and an upright second side wall 20 are connected to the floor 12 and to the front and back wall, 14 and 16, respectively. The upright second side wall 20 is interrupted by a door, generally illustrated as 21, to divide the second side wall 20 into front part 20A and back part 20B.

A front top, generally illustrated as 22, is pivotally secured to the top of the upright front wall 14, and a back top, generally illustrated as 24, is pivotally connected to the top of the upright back wall 16. When the front top 22 and the back top 24 are pivoted downwardly to rest on the upright first side wall 18 and the upright second side wall 20, the front top 22 and the back top 24 meet (as illustrated in FIG. 1) to cover the entire floor 12 of the camper base 10. If the front top 22 and the back top 24 are pivoted upwardly and away from the camper base 10, as illustrated in FIG. 3, the floor 12 of the camper 6 is uncovered to expose the internals of the camper 6.

The front top 22 has a front cavity 26 for storage of camping articles, and the like (see FIG. 5). The front top 22, also has a bottom 28 that expands the entire underside of the front top 22 such that when the front top 22 is pivoted upwardly and away from the camper 6 (i.e. the bottom 28 is disposed in a horizontal plane) as illustrated in FIGS. 3 and 5, a mattress 30 may be positioned on the bottom 28 to provide a resting place for the user. A forward wall 32 connects to the bottom 28 and to a top, generally illustrated as 34, which is supported by and interconnected to the bottom 28 via a pair of partitions 36—36. Top 34 has a reinforced section 38 and a horizontal section 40. The horizontal section 40 connects to the forward wall 32 and extends away therefrom generally parallel with respect to the bottom 28. An intermediary section 42 slopes away from the bottom 28 to terminate into the reinforced section 38 which also is generally parallel with respect to the bottom 28. A hatch 44 pivotally connects to the reinforced section 38 and includes a pair of grips 4613 46 integrally bound thereto for opening and closing the hatch 44 to control access to the front cavity 26.

A front rod 48 (generally in a U-shape) pivotally connects to the front top 22 at the ends of the forward wall 32, as illustrated in FIGS. 3 and 5. A generally U-shape first back rod 50 is pivotally secured to the camper base 10 at an end of the first side wall 18 and an end of the front part 20A. Similarly, a generally U-shaped second back rod 52 is also pivotally attached to the camper base 10 at an end of the first side wall 18 and an end of the front part 20A at a point common to where back rod 50 pivots to same.

Figure 7:
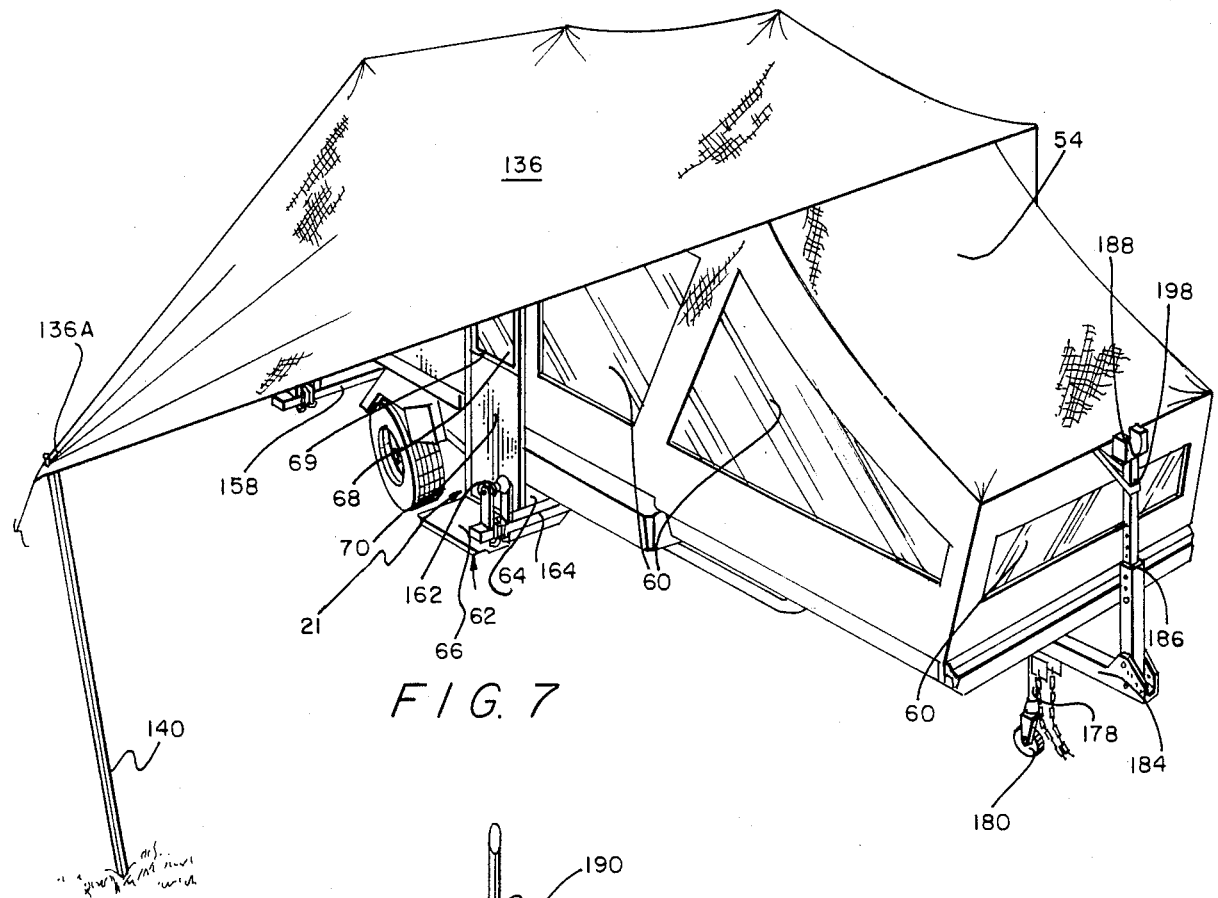
FIG. 7 is a perspective view of the camper in a disassembled position with a moisture-proof fabic upheld by a post.

A first moisture-proof fabric 54 (e.g. canvas with vinylcoating, water-proof tent, or the like) is bound to the front rod 48 and to the back top 24, and swings from the tops of the U-shaped front rod 48 and the U-shaped back rod 50 via straps 56 and 58, respectively. Moisture-proof fabric 54 contains a plurality of transparent sections 60 (as illustrated in FIGS. 5 and 7) to provide windows for the camper 6. The moisture-proof fabric 54 is also connected at its lowermost section around the bottom 28 of the front top 22, around the tops of the front part 20A, the back part 20B, the upright first side wall 18, and the perimeter of the upper part of the door 21. The moisture-proof fabric 54 is further connected to sides 61—61 of the back top 24 and to the ends 63—63 of the sides 61—61 as illustrated in FIGS. 3 and 5, such that when the door 21 is collapsed (as will be explained in greater detail hereinafter) and the rods 48, 50 and 52 and the front and back tops 22 and 24 respectively are all pivoted in direction of the arrows in FIGS. 3 and 5, the moisture-proof fabric 54 folds and/or collapses towards the floor 12 of the camper base 10. When the rods 48, 50 and 52 are pivoted to the dotted lines position of FIG. 5, and when the back top 24 is pivoted downwardly and the front top 22 is pivoted upwardly and towards the back top 24 until they meet, the moisture-proof fabric 54 becomes disposed within the camper base 10 and tucked underneath the front and back tops 22 and 24 respectively and the camper 6 is in the compact position of FIG. 1. This compact position of FIG. 1 enables and facilitates the traveling or towing of the camper 6 on the trailer 8.

Figure 11:
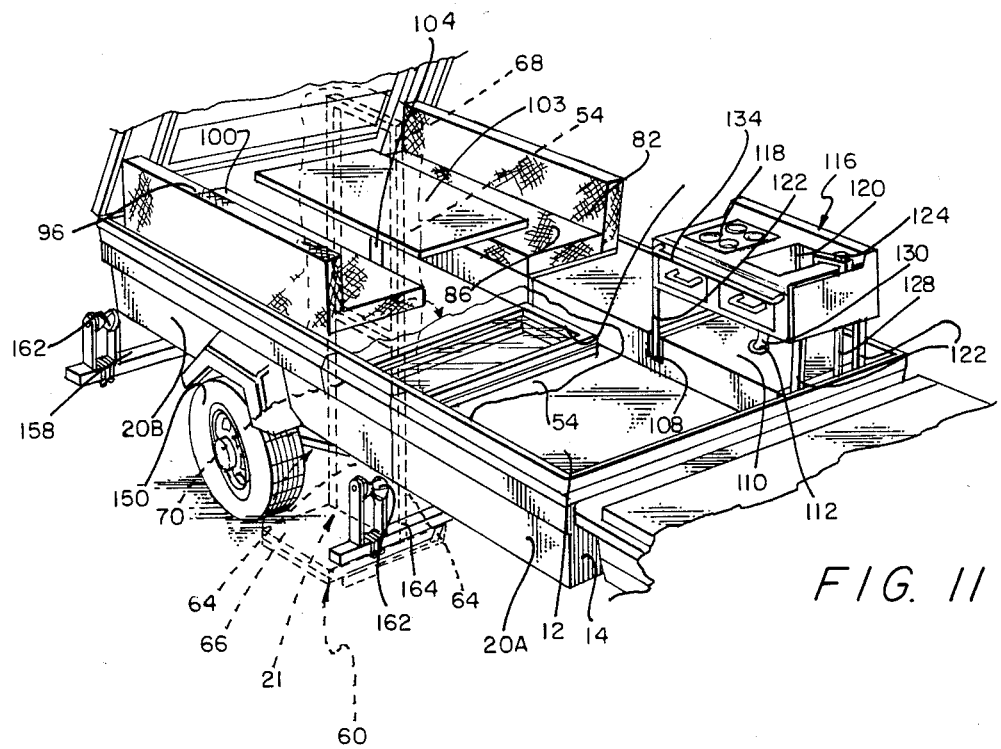
FIG. 11 is a partial perspective view of the seating-sleeping assembly, the stove-sink assembly, and the collapsible door that has been collapsed from the dotted line position.

As was indicated, the upright second side wall 20 is interrupted by the door 21, to divide the second side wall 20 into the front part 20A and the back part 20B. The upper part of the door 21 is secured to moisture-proof fabric 54 as indicated in FIGS. 7 and 11. The door 21 has a generally L-shaped base, generally illustrated as 62, that includes a first base section 64 pivotally connected to the floor 12 and a second base section 66 integrally bound to the first base section 64 (see FIGS. 3, 7 and 11). The first base section 64 defines part of the floor 12 and the second base section 66 defines part of the upright second wall 20 when the L-shaped base 62 is pivoted upwardly in direction of the arrow in FIG. 11 (see FIG. 1 for where second base section 66 forms part of the upright second wall 20 and closes off the gap between the front part 20A and the back part 20B). The door 21 also has a first door part 68 that is pivotally attached at 69 to a second door part 70. The first door part 68 is secured to the moisture-proof fabric 54 and pivots downwardly against the second door part 70 such that when the L-shaped base 62 of the door 21 is pivoted upwardly for the first base sections 64 to form part of the floor 12 and for the second base section 66 to form part of the upright second wall 20, the folded-together first door part 68-second door part 70 (as well as the attached moisture-proof fabric 54) rest on the floor 12 of the camper base 10 as indicated in FIG. 4 and FIG. 11. It should be noted that the door 21 may be manufactured such that the first door part 68 can pivot forward (in the opposite direction of the arrow in FIGS. 3 and 11) to lay against the front face of the second door part 70.

The camper base 10 additionally includes a seating-sleeping assembly, generally illustrated as 72 in FIGS. 3 and 13, in proximity to said back top 24. The seating-sleeping assembly 72 (see FIGS. 13 and 14) comprise a first seat top 74 having a slot 76 and is secured to the upright side wall and to the upright back wall 16. A first seat wall 78 is integrally bound to the first seat top 74 and to the floor 12 to form a first cavity 80 that includes a cylindrical conduit 81 wherein sails, booms, etc, may be stored for traveling. A first seat cushion back 82 is mounted on a support 84 that slidably lodges within slot 76 and a first seat cushion 86 is supported by the first seat top 74 in order to cushion a seating. A second seat top 88 contains a slot 90 and is secured to the back part 20B of the upright second side wall 20 as well as to the upright back wall 16. A second seat wall 92 is integrally attached to the second seat top 88 and to the floor 12 to form a cavity 94, similar to cavity 80. A second seat cushion back 96 is mounted on a support 98 that slidably lodges within slot 90 as illustrated in FIG. 13, and a second seat cushion 100 is supported by the second seat top 88 in order to cushion a seating similarly to first seat cushion 86. A third seat top 101 is integrally bound to the back wall 16 and a third seat wall 99 is attached to the floor 12 and to the third seat top 101. A third seat cushion 105 is supported by the third seat top 101 to provide a comfortable seating area. The seating-sleeping assembly 72 also comprises a table top 102 having mounted thereon a connector 103. Support 104 threadably engages the connector 103 and a base support 106 bound to the floor 12 in order to keep the table top 102 in an upright horizontal position for placing articles thereon, and the like. The table top 102 may be disassembled in order to provide sleeping area as illustrated in FIG. 14. To disassemble, support 104 is unscrewed from the connector 103 and the base support 106 to free-up the table top 102 which is subsequently positioned on the innermost edges of the first seat top 74 and the second seat top 88 as depicted in FIG. 14. First seat cushion back 82 and second seat cushion back 96 are removed from slots 76 and 90, respectively, and are disposed such as to have their respective supporting supports 84 and 98 flushed against the faces of the first seat top 74 and the second seat top 88, respectively. First seat cushion 86 and second seat cushion 100 are positioned on the facial plane of the table top 102 such that the exposed surfaces of the first and second seat cushions 86 and 100 respectively collimate to provide a comfortable surface to sleep.

The first seat top 74 extends substantially along the entire upright first side wall 18 as shown in FIGS. 3, 5, 6 and 11. The end of the first seat top 74 as it approaches the upright front wall 14 of the camper base 10 terminates into a slot 108. At the side of slot 108 is the beginning of a removable access cover 110 having an aperture 112. Access cover 110 terminates in close proximity to the upright front wall 14 into a slot 114. Pivotally secured to the access cover 110 through slots 108 and 114 is a stove-sink assembly, generally illustrated as 116.

The stove-sink assembly 116 comprises a stove 118, a sink 120, and a plurality (i.e. four) of legs 122 passing through the slots 108 and 114 and pivotally secured to the access cover 110 as depicted in FIGS. 15 and 16. The sink 120 has a three-way faucet 124 that is engaged to a water tank 126 through a hose 128. Sink 120 also has a drain hose 130 that extends through the aperture 112 to a drain tank, or the like (not shown in the drawings). A collapsible shelf 132 is pivoted to the side of the stove 118. The stove-sink assembly 116 may be pivoted away from the upright first side wall 18 and towards the middle of the floor 12 by pulling down on a pull-up handle/towel rack 134 that is bound to the front of the stove-sink assembly 116. The bottom of legs 122 are pivotally attached to the access cover 110 such that the bottom of the stove-sink assembly 16 may be disposed flat on the floor 12 as illustrated in FIG. 3 and FIG. 16. Such a position is required to close and/or collapse the camper 6 into the compact posture of FIG. 1. The stove-sink assembly 116 may be situated in a user position by grasping the pull-up handle/towel rack 134 and pulling upwardly until the stove-sink assembly 116 is in the upright position (as shown in FIGS. 3, 5 and 15).

As was previously indicated, the moisture-proof fabric 54 is bound to the front rod 48 and to the ends 63—63 of the sides 61—61 of the back top 24, and swings from the tops of U-shaped front rod 50 and U-shaped back rod 52 by straps 56 and 58, respectively. Attached to the tops of U-shaped front rod 50 and U-shaped back rod 52 is a second moisture-proof fabric 136 (e.g. water proof nylon fly). The second moisture-proof fabric 136 is also connected to an edge or free end 138 of the back top 24, as illustrated in FIGS. 3 and 5. A pole 140 supports a far end 136A of the moisture-proof fabric 136 such that an air space is created between the first moisture-proof fabric 54 and the second moisture-proof fabric 136 as can be clearly seen in FIG. 5. The air space has the following dual effects: air passing through the air space between the moisture-proof fabric 54 and moisture-proof fabric 136 has a cooling effect on the inside of the camper 6; and air from strong wing(s) is released through and into the air space to prevent the camper 6 from being rocked or pushed over.

Figure 2:
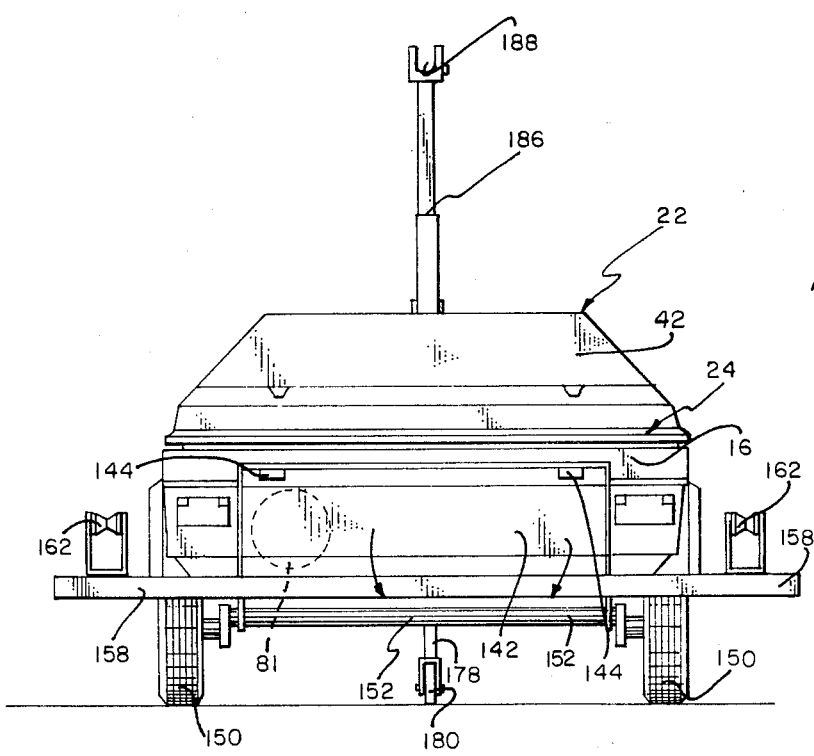
FIG. 2 is a rear elevational view of the camper and trailer of FIG. 1.

The upright back wall 16 (see FIG. 2) contains a rear hatch 142 with a pair of handles 144—144 that may be pivoted backward and in direction of the arrow in FIG. 5 to expose the internals of the cylindrical conduit 81 to store any sails and/or boom(s) or the like. Also, cavities (not shown in the drawings) underneath the third seat top 101 and the second seat top 88 are also exposed when the rear hatch 142 is pivoted open. These cavities may also be used to store articles and items.

Figure 12:
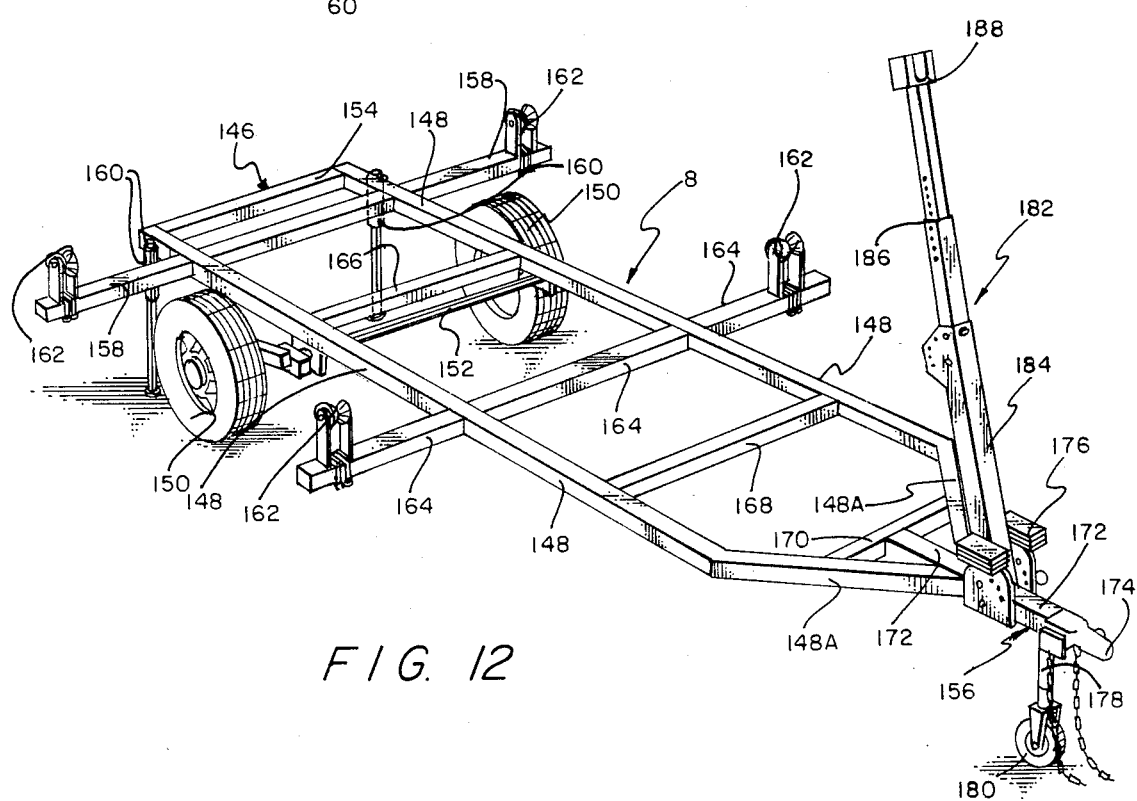
FIG. 12 is a perspective view of the trailer of this invention.

The trailer 8 may be any trailer that is capable of supporting the camper 6 of this invention. However, in a preferred embodiment of this invention, the trailer 8 comprises a general rectangular frame, generally illustrated as 146 (see FIG. 12), comprising a pair of longitudinal frame members 148—148 and supported by a pair of wheels 150—150 that rotate on an axle 152. One end of the longitudinal frame member 148—148 has integrally bound thereto an end beam 154 while the other end of the longitudinal frame members 148—148 converge with a pair of converging ends 148A—148A to connect with a generally T-shaped hitch member, generally illustrated as 156. A rear boat beam 158 extends across and beyond the longitudinal frame members 148—148. A pair of leveling jacks 160—160 attach to the rear boat beam 158 in proximity to the frame members 148—148 (as illustrated in FIG. 12) in order to level and stabilize the trailer 8 when parked with the camper 6 in the use and dissaembled position of FIG. 3. Each end of the rear boat beam 158 has an adjustable upstanding boat roller 162. Similar to the rear boat beam 158, a forward boat beam 164 extends across and beyond the longitudinal frame members 148—148. Each end of the forward boat beam 164 also has one of the adjustable upstanding boat roller 162. Connecting across the frame members 148—148 between the rear boat beam 158 and the forward boat beam 164 is an intermediate beam 166. A front beam 168 connects across the frame member 148—148 between the forward boat beam 164 and the converging ends 148A—148A.

The T-shaped hitch member 156 comprises a head 170 bound to each converging end 148A and a body 172 that attaches integrally to the head 170 and to the ends of the converging ends 148A—148A. The body 172 has connected thereto a ball hitch 174 and a generally bifurcated U-shaped front top support means/mast step 176 which supports the front top 22 when the same is pivoted to the open positions of FIG. 5. More specifically, when the front top 22 is pivoted open and away from the camper base 10, the horizontal section 40 of the top 34 of the front top 22 rests and is supported by the front top support means/mast step 176 as is illustrated in FIG. 5. Between the hitch member 174 and the front top support means/mast step 176 is a leveling jack 178 with a castering wheel 180.

Figure 8:
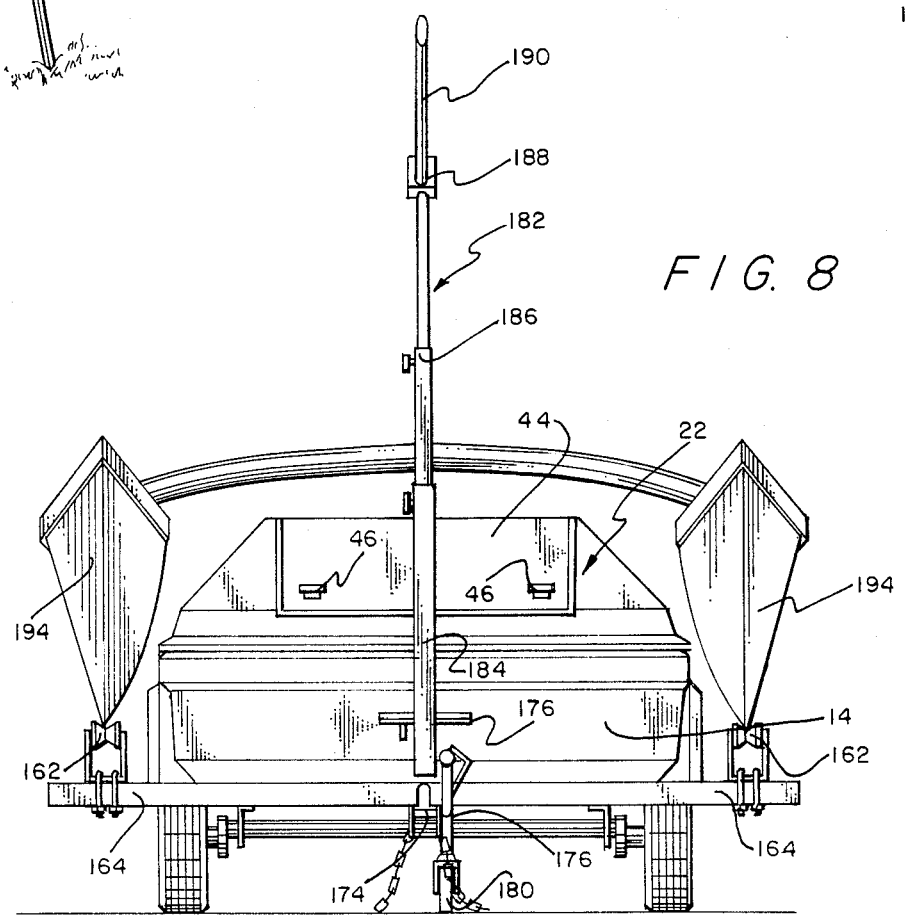
FIG. 8 is a front elevational view of the camper in a collapsed position and mounted on the trailer and straddled by a catamaran that is supported by the trailer.

An adjustable mast/tent support means, generally illustrated as 182, is pivotally connected to the front top support means/mast step 176. Adjustable mast/tent support means 182 comprises a support base 184 that is pivotally sandwiched at one end within the bifurcated front top support means/mast step 176 and pivoted at another end to a telescopical member 186 that terminates into a U-shaped head 188 which is adapted to receive a mast 190, or the like (see FIG. 9) of a catamaran, generally illustrated as 192, having a pair of hulls 194—194 supported by the adjustable boat rollers 162 on each end of the rear boat beam 158 and the forward boat beam 164 as illustrated in FIGS. 8 and 9. The telescopical member 186 including the U-shaped head 188 is also adapted to hold and retain the front rod 48 in an upright position through the use of a rod connector 198. The support base 184 is pivoted forward and downwardly such as to be generally parallel to the body 172 of the T-shaped hitch member 156. The telescopical member 186 is pivoted to be normal to the body 172 (see FIGS. 3, 5 and 7) and the rod connector 198 is subsequently engaged in any suitable manner around the telescopical member 186 and to the front rod 48. Thus, when the telescopical member 186 is substantially straight with respect to the support base 184 and the adjustable mast/tent support means 182 is tilted slitely away from an absolute normal position with respect to the T-shaped hitch member 156 (as illustrated in FIGS. 1, 8 and 9), the U-shaped head 188 is available to receive and retain the mast 190 of the catamaran 192 which is convenient (as shown in FIG. 9) for transporting the catamaran 192 with the trailer 8. When the telescopical member 186 is pivoted to a substantially normal position with respect to the support base 184, and the support base 184 is pivoted at its bottom within the U-shaped front top support means/mast step 176 to be essentially parallel with respect to the body 172 of T-shaped hitch member 156, the adjustable mast/tent support means 182 becomes a convenient support to hold upright the front rod 48 through the employment of the connector rod 198 as illustrated in FIGS. 3, 5 and 7.

With continuing reference to the drawings for operation of the invention and the method for transporting a catamaran/camper/trailer to a camp site, or the like, wherein the catamaran 192 is removed from the trailer 8 and the camper 6 may be disassembled into an upright structure to provide a habitat for persons, the catamaran/camper/trailer assembly of FIGS. 8 and 9 may be disassembled by initially removing the catamaran 192 from the trailer 8. The catamaran 192 straddles the camper 6 and is supported by the trailer 8. More specifically, the hulls 194-194 of the catamaran 192 are supported by the upright boat rollers 162 of the trailer 8 and may be removed from the same to expose the camper 6 mounted on the trailer 8, as depicted in FIG. 1. The leveling jack 178 with the castering wheel 180 is positioned such that the front end of the trailer 8 is substantially level with respect to a grid. The ball hitch 174 was utilized to transport the catamaran/camper/trailer assembly to a desired location. From the compact position of FIG. 1, the camper 6-trailer 8 assembly may be readily disassembled to provide an upright standing camper structure as illustrated in FIGS. 3, 5, and more particularly, FIG. 7. To accomplish such a structural assembly, the adjustable mast/tent support means 182 is positioned such that the support base 184 is essentially parallel with respect to the body 172 of T-shaped hitch 156 and the telescopical member 186 is substantially normal with respect to support base 184, all as illustrated in FIGS. 3, 5, and 7. After the adjustable mast/tent support means 182 has been adjusted as such, grips 46—46 may be grasped and pulled upwardly in order to unload any articles or the like that may have been stored within the front cavity 26 of the front top 22. Similarly, handles 144—144 may be gripped and pulled downwardly in order to pivot the bottom of rear hatch 142 against the upright back wall 16 to unload or load articles from any exposed cavities. Subsequently, the front top 22 is removed off of the tops of the upright first side wall 18, the second side wall 20, and pivoted along the top of the upright front wall 14 towards the positioned adjustable mast/tent support means 182 until the horizontal section 40 rests and is supported by the front top support means/mast step 176 and until the reinforced section 38 rests on the converging ends 148A—148A and on the head 170 and body 172 of the T-shaped hitch member 156. Subsequently, the back top 24 is pivoted rearwardly about the top of the upright back wall 16 in order to remove the back top 24 off of the top edges of the upright first wall 18 and the upright second wall 20. The back top 24 does not pivot all the way back since the first moisture-proof fabric 54 and the second moisture-proof fabric 136 are engaged respectively to the ends 63—63 of the sides 61—61 and to the free end 138 of the back top 24, as illustrated in FIG. 3. The back top 24 will only pivot up to about 80° with respect to a horizontal plane. The U-shaped front rod 48 is pivoted from the horizontal dotted line position in FIG. 5 to the upright dotted line position in FIG. 3. In such a position, the front rod 48 is essentially registered with the outside facial plane of the forward wall 32. The rod connector 198 may be engaged in a suitable manner to the front rod 48 and around the telescopical member 186 in order to support and hold the front rod 48 in the upright position as illustrated in FIG. 5. The generally U-shaped first back rod 50 and second back rod 52 may be raised from the dotted line position in FIG. 5 to the upright position as represented by dotted lines in FIG. 3. The door 21 may be positioned for use by removing the door 21 from the collapsible position in FIGS. 4 and 11 to the upright position as illustrated in FIG. 3. More specifically, the L-shaped base 62 of the door 21 is pivoted downwardly such that the second base section 66 is generally parallel with respect to a grid and the first base section 64 is essentially normal with respect to the floor of the camper base 10. Subsequently, the first door part 68 is pivoted on the top of the second door part 70 at 69 in order that the first door part 68 and the second door part 70 are erect as indicated in FIG. 3. The door 21 is now available to be used. The pole 140 may be inserted into the ground in order to support the end 136A of the moisture-proof fabric 136. When the end 136A is supported in such a position by the pole 140, an air space is created between the moisture-proof fabric 54 and the moisture-proof fabric 136. As previously indicated, this creates a cooling effect within the inside of the camper 8 as well as enabling high winds to pass through the air space therebetween without knocking over or pushing over the camper 6-trailer 8 combination. The stove-sink assembly 116 and the seating-sleeping assembly 72 may be erected as was previously indicated, that is, by grasping and pulling upwardly the pull-up handle towel rack 134 of the stove-sink assembly 116, the assembly 116 may be erected into a usable position as indicated in FIGS. 3, 5, and 11. The seating-sleeping assembly 72 may be erected from the sleeping position (or traveling position) as indicated in FIG. 14 to the seating position as indicated in FIG. 13 by threadably inserting the support 104 into the base support 106 and the connector 103 underneath the tabletop 102. The first seat cushion back 82 including its mounted support 84 is positioned such that the bottom on the support 84 is slidably disposed within the slot 76. Similarly, the second seat cushion back 96 with its mounted support 98 is similarly positioned such that the bottom of support 98 is slidably disposed within the slot 90. The first seat cushion 86 and the second cushion seat cushion 100 are subsequently put on top of first seat top 74 and the second seat top 88, respectively. In order to disassemble the camper 6 into the compact/traveling position of FIG. 1, the foregoing procedure is merely reversed as may be readily discernible and understood by any artisan possessing ordinary skill in the art.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A camper comprising
   a camper base means including a camper floor means, an upright front wall means attached to the camper floor means, an upright back wall means secured to the camper floor means, an upright first side wall means connected to the camper floor means, and an upright second side wall means attached to the camper floor means;
   a front top means pivotally secured to the top of the said upright front wall means;
   a back top means pivotally secured to the top of said upright back wall means such that when said front top means and said back top means are pivoted downwardly to rest on the upright first side wall means and on the upright second side wall means, said front top means and said back top means meet to cover the entire camper floor means;
   a door means that is pivotally connected to the camper base means;
   a front rod means pivotally connected to the front top means;
   a first back rod means pivotally secured to said camper base means;
   a second back rod means pivotally secured to said camper base means; and
   a moisture-proof fabric means connected to the front rod means, the first and second back rod means, and to the back top means; and a fly fabric means connected to said first and second back rod means and to the back top means.

2. The camper of claim 1 wherein said camper base additionally comprises a seating means that extends along said upright first side wall means, said upright back wall means, and said upright second side wall means.

3. The camper of claim 2 wherein said seating means comprises a first seat top bound to said upright first side wall means and to said upright back wall means, a first seat back slidably engaged within a first slot in said first seat top, and a first seat wall attached to said first seat top and to said camper floor means in order to define a first seat cavity.

4. The camper of claim 3 wherein said seating means comprises a second seat top bound to said upright second side and to said upright back wall means between said upright back wall means and said door means, a second slot in said second seat top, and a second seat wall attached to said second seat and to said camper floor means in order to define a second seat cavity.

5. The camper of claim 4 wherein said seating means comprises a third seat top bound to said upright back wall means and a third seat wall attached to said third seat top and to said camper floor means.

6. The camper of claim 1 wherein said door means interrupts the upright second side wall means into a front side wall and a rear side wall and said door means comprising a generally L-shaped door base means having a first section pivotally connected to the camper floor, and a second section integrally bound to the first section, said first section defining part of the camper floor and said second section defining part of the upright second side wall when said door base is pivoted upwardly;
   said door means additionally comprising a door that is mounted on said second section of the door base.

7. The camper of claim 6 wherein said door comprises a first door part pivotally connected to the second door part.

8. The camper of claim 1 additionally comprising a stove-sink means that is pivotally connected to said camper base means which may be elevated pivotally.

9. The same camper of claim 1 additionally comprising a table means removably attached to said camper floor.

10. The camper of claim 1 wherein said front top means has a front cavity defining a front storage means, a front top bottom means expanding the entire bottom of said front top means and defining the bottom of said front storage means of said front cavity, a forward wall connected to the front top bottom means, a top means that connects to the bottom means and to said forward wall, said top means extending from said forward wall generally horizontally with respect to said bottom means and sloping away from the bottom means to terminate into a reinforced section that is generally parallel with respect to the bottom means, and a first hatch means pivotally secured to the first reinforced section.

11. The camper of claim 1 wherein said front rod means, said first and second back rod means are generally U-shaped.

12. The camper of claim 1, additionally comprising a rear hatch pivotally connected to said upright back wall means.

13. The camper of claim 12 additionally comprising a trailer means supporting said camper.

14. The camper of claim 13 additionally comprising a catamaran straddling said camper and supported by said trailer means.

15. The camper of claim 14 wherein said trailer means comprises a front top support/mast step means.

16. The camper of claim 15 wherein said trailer means comprises an adjustable mast/tent support means pivotally connected to said front top support/mast step means.

17. The camper of claim 17 wherein said adjustable mast/tent support means comprises a support base pivotally connected to said front top support/mast step means, and a telescopical member pivotally secured to said support base.

18. A camper comprising
a camper base means including a camper floor means, an upright front wall means attached to the camper floor means, an upright back wall means secured to the camper floor means, an upright first side wall means connected to the camper floor means, and an upright second side wall means attached to the camper floor means;
a front top means pivotally secured to the top of the said upright front wall means;
a back top means pivotally secured to the top of said upright back wall means such that when said front top means and said back top means are pivoted downwardly to rest on the upright first side wall means and on the upright second side wall means, said front top means and said back top means meet to cover the entire camper floor means;
at least one rod means pivotally secured to said camper base means;
a moisture-proof fabric means connected to the at least one rod means, and to the back top means ; and
a fly fabric means connected to said at least one rod means and to the back top means.

19. A camper comprising
a camper base means including a camper floor means, an upright front wall means attached to the camper floor means, an upright back wall means secured to the camper floor means, an upright first side wall means connected to the camper floor means, and an upright second side wall means attached to the camper floor means;
a front top means pivotally secured to the top of the said upright front wall means;
a back top means pivotally secured to the top of said upright back wall means such that when said front top means and said back top means are pivoted downwardly to rest on the upright first side wall means and on the upright second side wall means, said front top means and said back top means meet to cover the entire camper floor means;
at least one rod means pivotally secured to said camper base means;
a moisture-proof fabric means connected to the at least one rod means; and
a stove-sink means pivotally connected to said camper base means.

20. A camper and trailer combination comprising a trailer means including a front top support/mast step means; a camper means supported by said trailer means, said camper means comprising an upright front wall means and a front top means pivotally secured to the top of the upright front wall means; and an adjustable mast/tent support means pivotally connected to said front top support/mast step means.

21. The camper and trailer combination of claim 20 additionally comprising a catamaran means straddling said camper means and supported by said trailer means.

22. A camper and trailer combination comprising a trailer means having a front and an adjustable mast/tent support means; a camper means supported by said trailer means; said adjustable mast/tent support means comprises a base end pivotally connected to said front and a top end opposed to said base end, and said base end pivoting to project upwardly from said front and said top end adaptable for receiving a mast means of a catamaran means when the catamaran means is being transported by the trailer means.

23. The camper and trailer combination of claim 22 additionally comprising a catamaran means straddling said camper means and supported by said trailer means.

24. The camper and trailer combination of claim 22 wherein said camper means comprises a front top means pivotally secured thereto, said front top means includes a cavity defining a front storage means.

25. The camper and trailer combination of claim 23 wherein said camper means comprises
a camper base means including a camper floor means, an upright front wall means attached to the camper floor means, an upright back wall means secured to the camper floor means, an upright first side wall means connected to the camper floor means, and an upright second side wall means attached to the camper floor means;
a front top means pivotally secured to the top of the said upright front wall means;
a back top means pivotally secured to the top of said upright back wall means such that when said front top means and said back top means are pivoted downwardly to rest on the upright first side wall means and on the upright second side wall means, said front top means and said back top means meet to cover the entire camper floor means;
at least one rod means pivotally secured to said camper base means; and
a moisture-proof fabric means connected to the at least one rod means.

26. A method for transporting a catamaran-camper-trailer comprising the steps of:
(a) mounting a collapsible camper means on a trailer means that includes a plurality of boat roller means extending outwardly therefrom;
(b) collapsing the camper means into a compact position;
(c) straddling the collapsed camper means of step (b) with a catamaran means while the boat roller means supports the catamaran means;
(d) adjusting an adjustable mast/tent support means that is pivotally secured to the trailer means;
(e) disposing a mast of the catamaran means on the adjustable mast/tent support means; and
(f) transporting the trailer means that supports the collapsed camper means and catamaran means to a desired location.

27. The method of claim 26 additionally comprising removing the catamaran means from its straddled position on the trailer; and disassembling the collapsed trailer means into an upright structure to provide a habitat for persons.

28. The method of claim 26 additionally comprising forming the collapsible camper means with a moisture-proof fabric means and with a fly fabric means.

29. The method of claim 27 wherein said disassembling comprises pivoting a stove-sink assembly into an upright position.

30. The combination of claim 22 wherein said top end of said adjustable mast/tent support means is pivotally secured to said base end of said adjustable mast/tent support means.

31. The combination of claim 22 wherein said top end of said adjustable mast/tent support means comprises a telescopical member pivotally secured to said base end.

* * * * *